May 20, 1941.  J. HEINZEL  2,242,885
CONTROL MECHANISM
Filed Sept. 9, 1937  2 Sheets-Sheet 1
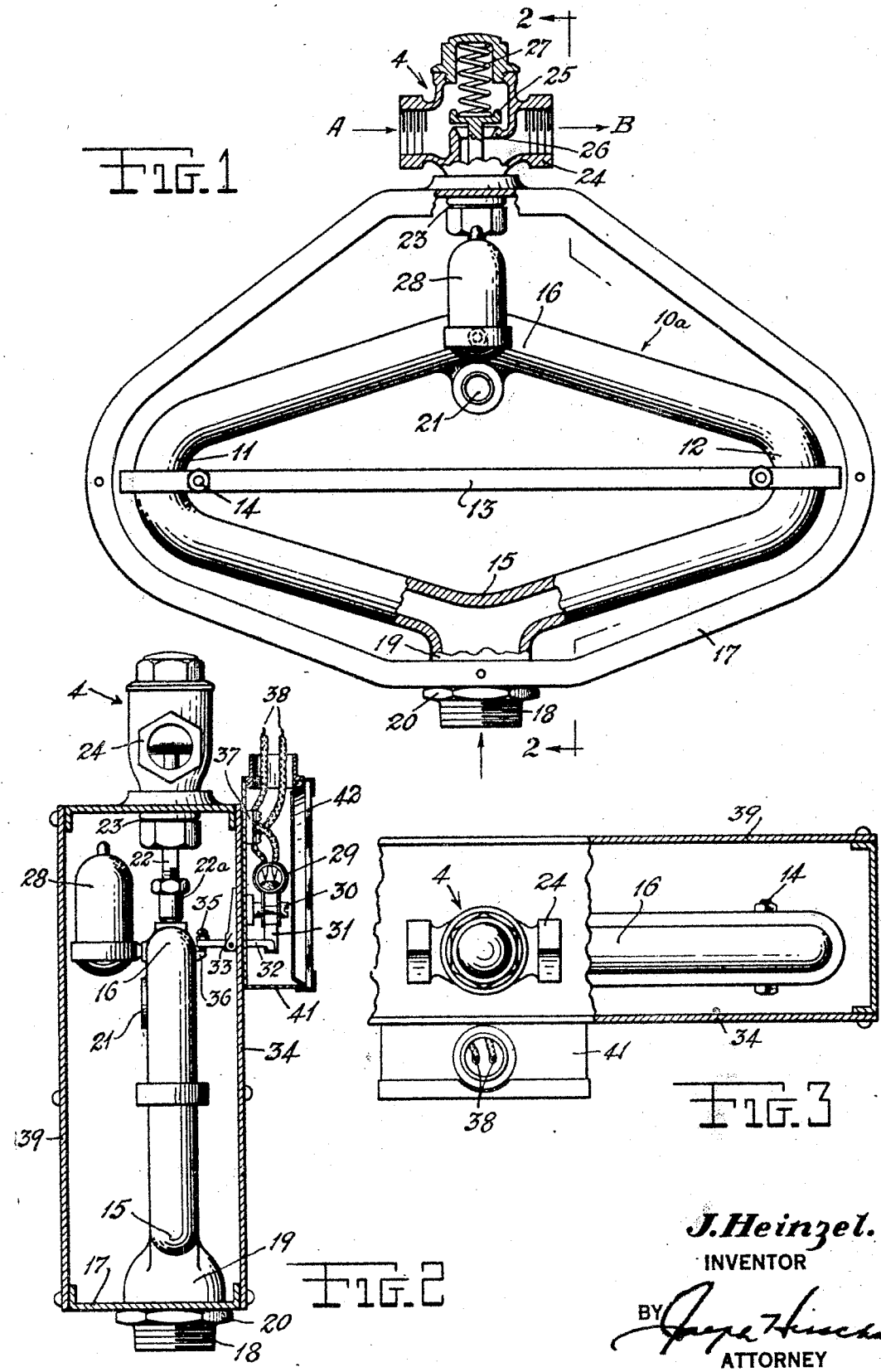
J. Heinzel.
INVENTOR May 20, 1941. J. HEINZEL 2,242,885
CONTROL MECHANISM
Filed Sept. 9, 1937 2 Sheets-Sheet 2

J.Heinzel.
INVENTOR
BY [signature]
ATTORNEY

Patented May 20, 1941

2,242,885

UNITED STATES PATENT OFFICE 2,242,885

CONTROL MECHANISM

Joseph Heinzel, Copiague, N. Y.

Application September 9, 1937, Serial No. 162,974

12 Claims. (Cl. 122—448)

The present invention relates to devices for automatically controlling a valve or other mechanism in response to changes in the operating conditions in an apparatus under control, such as a boiler, a commercial refrigerating plant, a hot water heating system, the water feed line of a steam heating plant, etc.

It is the general object of the invention to provide improved automatic mechanism functioning reliably to make the proper adjustments so as to restore normal operation when an abnormal condition arises in the apparatus under supervision.

It is a particular object of the invention to provide an improved thermostatic element capable of generating considerable power and thus able to operate various kinds of control devices without the aid of air or other relays, and adapted to be associated or connected with a boiler or other apparatus so as to be responsive to conditions of temperature or pressure therein.

It is also an object of the invention to provide an improved thermostatic control mechanism in the form of an expansible member which is subjected to the action of a pressure-balanced system of two fluids of different temperature, such as steam and water, the proportion of the fluid of higher temperature varying in accordance with fluctuations in the condition under control.

More specifically, it is an object of the invention to provide a thermostatic control mechanism in the form of a closed hollow tube, preferably although not necessarily of quadrilateral form, having lower and upper inlets for, respectively, a liquid of lower temperature whose flow is under control, and its vapor of higher temperature, the two fluids being in equilibrium within the tube and the height of the column or columns of steam within the tube, and hence the degree of heating of the latter, being determined by the level of the liquid in the apparatus under control, said tube being arranged to operate a valve or other device which controls the flow of liquid into the controlled apparatus.

It is also an object of the invention so to construct and arrange a thermostatic control mechanism of the type indicated that the expansible member is not affected to any control-disturbing degree by the temperature of the apparatus being controlled or of the ambient air.

It is a further object of the invention to provide a temperature and pressure responsive device in the form of a hollow tubular member which can, for example, be connected with the steam line of a boiler in such manner that the amount of steam entering such responsive device varies in dependence upon the water level of the boiler, the temperature and accordingly the degree of expansion of the responsive device being thus a function of the water level in the boiler.

Other objects and advantages of the invention will be apparent from the following description, and the features of novelty will be set forth in the appended claims.

While my invention is capable of many different embodiments, it is of particular advantage for automatically controlling the flow of feed water to a boiler and will accordingly be described in greater detail by way of example as employed to control the feed water valve of a steam boiler of a steam heating system.

On the accompanying drawings,

Fig. 1 is a view in elevation, partly in section, of a thermostatic device constructed in accordance with the invention, the cover plate being removed;

Fig. 2 is an end view thereof with the casing shown in section;

Fig. 3 shows a fragmentary plan view of the thermostatic mechanism and

Figure 4:
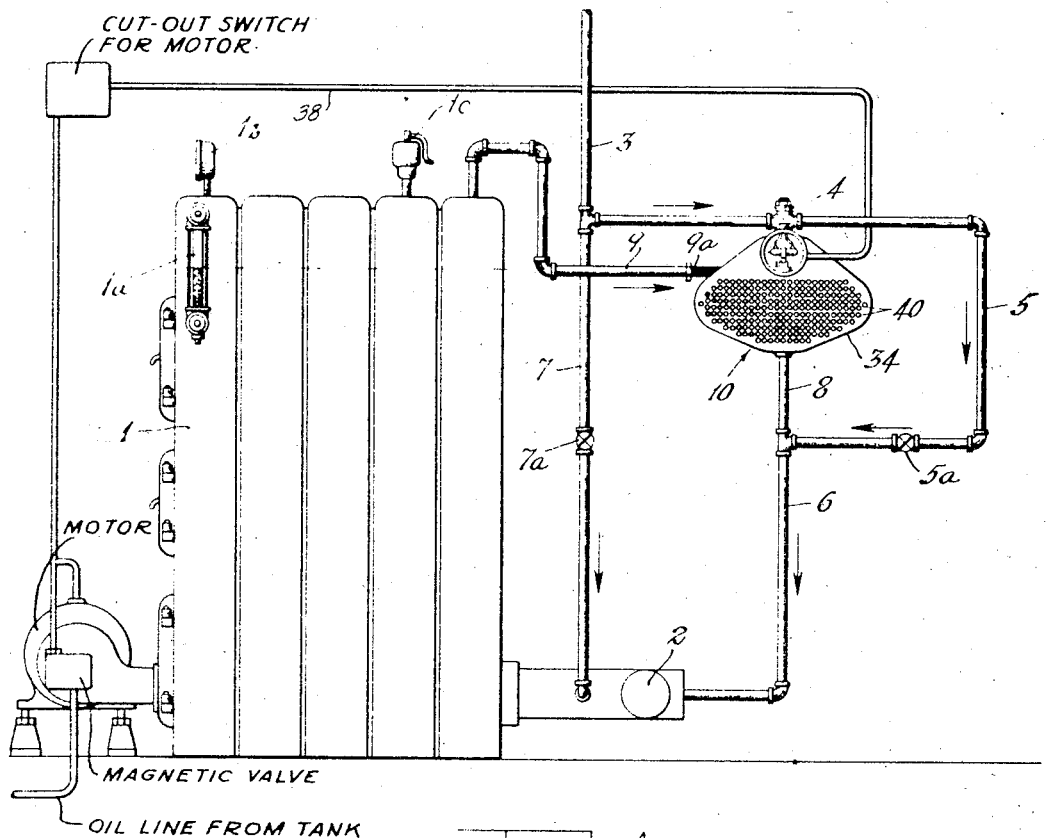
Fig. 4 shows diagrammatically a steam boiler of a heating system and my improved control mechanism associated therewith.

Referring to Fig. 4, the boiler of the heating system selected for illustration is shown at 1 and is provided with the usual water gauge 1a, pressure gauge 1b and safety valve 1c. The heating steam condensate return pipe is indicated at 2, and water for replacing losses in the system is supplied by a pipe 3 connected to a city or other main, usually at about 75 pounds pressure, or to a supply tank, the flow being controlled by a valve 4 as described in detail hereinbelow, and the water passing through a pipe 5 and valve 5a to a pipe 6 and thence to the boiler. A by-pass conduit and valve are shown at 7 and 7a, respectively. From the pipe 6 there rises a pipe 8 and from the steam space of the boiler there runs a pipe 9 terminating in a flexible coupling 9a, both the pipe 8 and coupling 9a being connected to the control mechanism indicated generally at 10 in a manner and for a purpose which will now be described.

Referring to Figs. 1 to 3, my improved control device comprises a tubular member 10a in the form of a closed loop or ring-like structure which may take a variety of forms but is preferably more or less rhombic in shape, as illustrated. The member 10a is made of metal, preferably aluminum or other good heat-conducting material. The more remote opposite ends or vertices 11 and 12 are connected by a relatively rigid band or stay rod 13 which is looped about such ends and is clamped thereto as by means of bolts 14, thereby preventing expansion of the member 10a at such ends. One of the pair of nearer opposite ends 15 and 16 of the rhombic structure is securely clamped to a frame 17, the secured end 15 being provided with a threaded nipple 18 which passes through a suitable opening in the frame 17, the connection being provided at one side with a shoulder 19 which engages the inside surface of the frame, while a nut 20 on the nipple engages the opposite side of the frame. The nipple 18 is adapted to be connected to the pipe 8 by any suitable coupling (not shown).

It will be seen from the structure and mounting of the tubular member 10a, which in the illustrated embodiment of the invention serves as a thermostatic element, as will be described more fully hereinbelow, that expansion and contraction of such tubular member, due to changes in the temperature thereof, will be manifested for the most part by a vertical movement of the free end or vertex or apex portion 16, the tubular member being prevented from moving laterally at the vertices 11 and 12 by the stay rod 13.

The tubular member 10a is adapted to be connected by way of the flexible coupling 9a, which is connected to the member 10a at 21, with the steam space of the boiler, the inlet 21 being located at the normal level of the water in the boiler, the arrangement being such, as will be explained below, that upon fall of the water level in the boiler, steam is caused to enter the tubular member and raise the temperature thereof. When this happens the vertex portion 16 rises and lifts a valve stem 22 which passes through a suitable stuffing box 23 associated with the valve body 24 secured in any suitable manner to the upper portion of the frame 17. The upper portion of the valve stem 22 is provided with a valve head 25 which cooperates with its seat 26 to control the flow of feed water to the boiler, the feed water entering at A from the pipe 3 and leaving the valve at B by way of the pipe 5. The valve head 25 is engaged by a spring 27 which urges it toward th closed position.

In the normal operation of the thermostatic mechanism so far described, the water is at the same level in the tubular member 10a as in the boiler 1, that is, at approximately the level of the steam inlet 21. Upon the entry of steam into the tubular system 10 the air in such system is first expelled through an air valve 28, and as the vertex portion 16 of the tubular member heats up, it rises, but does not yet actuate the valve stem 22 because of a clearance provided by a suitable adjustment of a setting member 22a (Fig. 2). However, upon fall of the water level, the steam fills such a large portion of the member 10a that the vertex portion 16 rises sufficiently to lift the valve stem 22, thereby opening the valve 4 and permitting water to enter the boiler until the water level rises to such a height that the rising column of water in the member 10a cools the latter sufficiently to cause contraction and lowering of the part 16. The valve will then close under the action of its spring 27, cutting off the further feed of water to the boiler.

Should there by an interruption in the supply of water to the valve 4 for any reason, fall of the water level in the boiler, and hence in the member 10a thus failing to bring about the feed of the water to the boiler, the temperature of the tubular member 10a will increase, and the vertex portion 16 will rise higher and open the valve 4 to more than normal extents, but with no effect on the feed of water to the boiler. To guard against the resultant possibility of injury to the boiler, I provide mechanism controlled by the member 10a for cutting off the supply of fuel to the boiler upon failure of the water supply. This mechanism includes an electric switch, illustrated in the drawings in the form of a mercury switch 29, which is pivotally mounted upon a pin or stud 30 and is adapted to be rocked on such pin or stud by way of an extension 31 which is engaged by one end of a lever 32 pivoted at 33 upon a bracket attached to a cover plate 34 secured to the frame 17, the opposite end of the lever being provided with an adjustable contact screw 35 engaged by a lug 36 secured to the member 10a at the vertex portion 16. The contacts of the mercury switch are connected to a terminal board 37 from which run conductors 38, which lead to an electric operating or controlling mechanism for a burner, stoker, etc., of the boiler.

The parts are so proportioned and related that when the lug 36 rises beyond a certain height, which occurs when the water level has fallen and the supply of water has failed, resulting in excessive rise of temperature of the member 10a, the mercury switch 29 will be tilted sufficiently to break the connection between the terminals and thereby cause stoppage of the feed of fuel to the boiler. The switch 29 is preferably so mounted that when it is once tilted to the open position it remains in such position until it is manually closed.

The thermostatic control device 10a should of course be so positioned with respect to the column of water in the boiler that it is brought into switch opening action before any injury can be caused to the boiler by reason of the failure of the water supply. As shown in Fig. 4, the pipe 8 leading from the water compartment of the boiler is connected to the member 10a at a point safely above the bottom of the boiler water column, so that only a relatively small drop in the water content of the boiler will be sufficient to cause operation of switch 29.

To promote rapid cooling of the member 10a and hence closing of the valve 4 when the water level has risen to the desired extent, the member 10a may be supported in such manner as to be exposed to the atmosphere. Thus it may be entirely open on all sides, but if desired it may be enclosed within a casing composed of the frame 17, the cover plate 34 and a second cover plate 39. In such case, however, the plates 34 and 39 and desirably also the frame 17 should be provided with perforations as shown at 40 in Fig. 4 to promote the circulation of air. To increase the rapidity of cooling of the member 10a it may be provided with fins or ribs (not shown) to increase the heat radiating surface.

The mercury switch 29 may be protected within a separate housing 41 secured in any desired manner to the cover plate 34, both such plate and the adjacent wall of the casing 41 being provided with a vertical slot through which the lever 32 passes. The casing 41 may be provided with a removable or swingable door having a glass panel 42 through which the condition of the switch 29 can be observed.

The pipes 6 and 9 should be of approximately the same diameters in order that the steam and water pressures within the member 10a may be the same. It will be noted that the steam has free access to the interior of the member 10a and so has the water from the boiler. The condensed steam will of course flow to the lower portion of the member 10a and ultimately return to the boiler by way of the pipes 8 and 6.

From the above it will be seen that I have provided an extremely simple mechanism for controlling a valve or other member in response to changes in the level of the water in a boiler, the mechanism being free of floats and other devices which are likely to get out of order, the valve or other controlled element being operated not directly by a float or similar lever responsive device, but rather by expansion of the member 10a. In this way a mechanism is provided which is rugged and reliable in operation and generates the necessary power for operating the valve stem or equivalent element. While a balanced type of valve 4 could be employed, I have found that such valve is not necessary because of the enormous force generated by the expanding member 10a. I have found that with a ½" valve the member 10a will operate satisfactorily and without knocking even when the water pressure is as high as 180 pounds per square inch.

It may be mentioned that the air valve employed by me is of known type and is provided with a float member which closes when water enters the same. The valve is also provided with a mechanism which closes the discharge port of the valve when steam enters the latter. The air valve is of course employed only in steam and similar vapor systems. Its use will ordinarily not be necessary in, for example, a hot water heating system.

It will be obvious that it is not necessary that the water and steam be introduced into the interior of the member 10a. Thus, the member 10a may be positioned in a tank connected with the boiler in such manner that the level of the water in the tank is approximately at the top of such member, the overlying space being connected with the steam space of the boiler. Upon fall of the water level the steam will heat a larger portion of the member 10a causing expansion thereof, which can be utilized to operate a valve stem or other member as described hereinabove. In such an arrangement it is not essential that the member 10a be hollow, although the hollow form is preferred.

In a hot water plant my improved responsive member 10a may be utilized to operate a relief valve when the pressure in the system becomes excessive. In such an arrangement the member 10a is provided only with an inlet which is connected with the boiler or with the riser pipe. Increases of the water pressure will cause expansion of the member 10a, the latter being arranged to operate a relief valve which causes discharge of water into a drain.

In the case of a steam plant control mechanism constructed and successfully operated by me the member 22a is normally spaced about 0.007" above the portion of the member 10a which engages it upon expansion of the member 10a. In a hot water system the member 22a is adjusted in accordance with the water pressure it is desired to maintain in the system.

The responsive member 10a can also be employed in commercial ice plants for controlling the flow of refrigerating fluid, such as ammonia. When employed in this manner, the responsive member is immersed in the cooling brine, one portion thereof being secured against movement, all of the movement attending the heating and cooling of the member being limited to the opposite, free portion of the member. The member 10a may in such case be in the form of a closed or looped solid rod or it may be in the form of a looped tubular system which may or may not be filled with an expansible fluid.

The frame 17, in the form of the invention shown in Fig. 1, should be made of as nearly non-expansible metal as possible, but steel is quite satisfactory. It should not however be made of a metal having a high coefficient of expansion, such as aluminum. The member 10a, on the other hand, should be made of a material having a relatively high coefficient of expansion, such as aluminum, copper, bronze, etc.

Although in the form of the invention illustrated in the drawings both water and steam enter the tubular member 10a under normal conditions, it is not absolutely essential that this be so. Thus, the arrangement may be such that the column of water in the pipe 8 acts as a trap, preventing the flow of steam from the pipe 9 to the interior of the member 10a which in such case is positioned at a distance from the pipe 9. In such an arrangement the pipe 9 communicates with the pipe 8 at a point slightly below the normal water level in the boiler, the water in the pipe 8 and also in the horizontal portion of the pipe 9 thus acting as a seal which prevents the flow of steam to the upper portion of the pipe 8 which communicates with the inlet 18 of the member 10a (the latter will, in this embodiment of the invention, have no second inlet 21). Upon fall of the water level below the height of the pipe 9, steam will enter the member 10a, which may be mounted as illustrated in Fig. 1, causing expansion of said member and opening of the feed water valve; as the water level in the boiler rises, water will enter and occupy the lower portion of pipe 9, and the flow of steam to the member 10a will be cut off. Should the water supply fail, the member 10a will be heated to such an extent as to cause operation of the switch 29 to cut off the supply of fuel to the boiler.

It will be seen from the foregoing that I have provided a thermostatic control apparatus which is removed from the boiler but which in miniature approximately duplicates the conditions in the boiler, the water being at the same level as in the boiler, and, as in the boiler, being in pressure equilibrium with the steam above it.

Various other modifications of the invention can be resorted to by those skilled in the art without departing from the spirit of the invention or the scope of the appended claims.

I claim:

1. Apparatus for automatically regulating the supply of feed water to a boiler, comprising a tubular member in the form of a closed loop which is removed from the boiler and is connected adjacent to its bottom portion with the water space and adjacent to its top portion with the steam space of the boiler, said member being so positioned with reference to the boiler that the water level in said member is normally adjacent to the top thereof; means for rigidly securing the portion of the said member adjacent to the water inlet against movement as a result of expansion of such member, the opposite portion of said member adjacent to the steam inlet end being free to move in response to the changes in the physical influences acting on such member, said member being adapted to expand as the water level falls and to contract as the water level rises, a water feed line, a valve in said line and arranged to be actuated by said tubular member, mechanism for feeding fuel to the boiler, and means actuated by said member when the latter is expanded to an abnormal degree for operating said mechanism to cause stoppage of the feed of fuel to the boiler.

2. The combination with a boiler, of mechanism for controlling the flow of feed water to such boiler, comprising a tubular member in the form of a closed loop having vertically spaced inlets connected to the water and steam spaces of the boiler, said member being so arranged relative to the boiler that it is normally filled partly with water and partly with steam, one pair of opposite ends of said member being held against movement, whereby relative movement between the opposite ends at right angles to the first-mentioned ends can take place in response to changes in the physical influences acting on the tubular member, a feed water line, and a valve in said line arranged to be actuated by said member for controlling the supply of water to the boiler.

3. Apparatus as set forth in claim 1, wherein the fuel feed mechanism controlling means is arranged to be operated by the looped member in only one direction, said means requiring manual resetting to restore the supply of fuel.

4. In a boiler system, the combination with a feed water line and valve therein, of mechanism for feeding fuel to the boiler, a device sensitive to changes in the water level in the boiler and arranged to actuate the valve to feed water to the boiler upon normal drop in the water level in the boiler, and an electric switch arranged to be operated by said device to actuate the fuel feeding mechanism to stop the supply of fuel to the boiler when the water level has fallen to an abnormal degree, said sensitive device being provided with a member which operates the switch in only one direction, said switch requiring manual resetting to effect resumption of the supply of fuel and return of said sensitive device from an abnormal to a normal condition being itself incapable of effecting such resumption.

5. Apparatus for automatically regulating the supply of feed water to a boiler, comprising a tubular member in the form of a closed loop removed from the boiler and connected adjacent to its bottom portion with the water space and adjacent to its top portion with the steam space of the boiler, said member being so positioned with reference to the boiler that the water level in said member is normally adjacent to the top thereof, an air discharge valve connected adjacent to the top of said tubular member, means for rigidly securing the portion of said member adjacent to one of said inlets against movement as a result of expansion of such member, the opposite portion of said member adjacent to the other inlet being free to move in response to the changes in the physical influences acting on such member, means for holding the intermediate portion of said member against movement, said member being adapted to expand as the water level falls and to contract as the water level rises, the steam column in said member simultaneously increasing and decreasing, respectively; a water feed line, a valve in said line having a valve head therein and a spring urging said head to its closed position, and an adjustable lost motion connection between the tubular member and the valve head adapted to transmit movement from said member to said head when the member has been heated sufficiently by the steam from the boiler, but leaving said valve head unaffected by normal increase in the atmospheric temperature.

6. A feed water supply control system for boilers comprising, in combination, a tubular member in the form of a closed loop arranged in a vertical plane and having an inlet in its upper portion for steam and a separate inlet at its lower portion for water, connections between said inlets and the steam and water spaces, respectively, of the boiler, said member being so positioned with reference to the boiler that the water level normally lies between the steam and water inlets, means for rigidly securing one portion of said member against movement as a result of expansion and contraction thereof, the opposite portion of said member being free to move in response to such expansion and contraction, means for holding the intermediate portion of the member against movement, said member being adapted to expand as the water level falls, and to contract as the water level rises, a water feed line, and a valve in said line arranged to be opened by the tubular member as the water level falls, said water feed line from the valve opening into the connection between the bottom inlet of the tubular member and the water space of the boiler.

7. A control mechanism for regulating a valve in the feed water line of a boiler in accordance with changes in the water level in the boiler, comprising a tubular thermostatic member in the form of a closed loop, means for securing one portion of said member against movement while the opposite portion is free to move as the member is subjected to expanding and contracting influences, pipes associated with the thermostatic member and connected with the steam and water spaces of the boiler, said pipes and thermostatic member being so arranged as to regulate the flow of steam from the boiler to the thermostatic member in accordance with changes in the water level in the boiler, said member being adapted to be positioned to regulate said valve in accordance with the quantity of steam conducted to such member.

8. Apparatus for automatically regulating the supply of feed water to a boiler, comprising a tubular member in the form of a closed loop arranged in a vertical plane and connected adjacent to its bottom portion with the water space and adjacent to its top portion with the steam space of the boiler, said member being so positioned with reference to the boiler that the water level in said member corresponds to that in the boiler and is normally adjacent to the top of such member, means for rigidly securing the portion of the said member adjacent to the water inlet against movement as a result of expansion of such member, the opposite portion of said member adjacent to the steam inlet end being free to move in response to the changes in the physical influences acting on such member, said member being adapted to expand as the water level falls and to contract as the water level rises, a water feed line, and a valve in said line and arranged to be actuated by said tubular member.

9. In combination, a rigid frame, a valve mounted on said frame and having a downwardly projecting stem, and a control member for said valve comprising a tubular element in the form of a closed, quadrilaterally shaped loop secured at one of its corner portions to the frame and the two adjacent corner portions being secured to each other against relative movement, the fourth corner portion being adjacent to the valve stem and being free for vertical movement, said tubular member having vertically displaced, separate inlets for fluids of different temperatures, the columns of fluid in the member being variable in accordance with conditions in an apparatus under control, said movable corner portion cooperating with the stem of the valve to cause opening and closing of the valve in response to changes in the heating effect of said fluids on said tubular member, said frame including side plates encasing the tubular member, and provided with ventilating perforations.

10. A control mechanism as set forth in claim 7, wherein the steam pipe is connected adjacent to the top of the thermostatic member and the water pipe adjacent to its bottom, and an air vent valve connected to the thermostatic member adjacent to the steam inlet.

11. In a feed water regulating system, the combination with a boiler and the feed water line thereof, of a member for controlling the flow of feed water to the boiler, a thermostatic control device removed from the boiler and including a thermostatic element bent in the form of a closed loop and arranged to control said member by its expansion and contraction, and conduits leading from the steam and water spaces of the boiler and connected to supply boiler steam and water to said control device, the steam and water charged to said device being in pressure equilibrium therein, and said device being so arranged to one side of the boiler that the water rises in said device to a level corresponding to that in the boiler, said thermostatic element being expanded by the heating action of the steam supplied by the steam conduit as the water level falls, and thereupon actuating the feed water control member to effect feed of water to the boiler.

12. The combination according to claim 2, including an adjustable lost-motion connection between the tubular member and the valve.

JOSEPH HEINZEL.